(12) United States Patent
Jun et al.

(10) Patent No.: US 7,394,802 B2
(45) Date of Patent: Jul. 1, 2008

(54) NETWORK SYNCHRONIZATION SYSTEM AND METHOD USING SYNCHRONOUS MOBILE TERMINAL AS EXTERNAL REFERENCE CLOCK

(75) Inventors: Sun-Mi Jun, Daejeon (KR); Nam-Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 894 days.

(21) Appl. No.: 10/625,578

(22) Filed: Jul. 22, 2003

(65) Prior Publication Data
US 2004/0125822 A1 Jul. 1, 2004

(30) Foreign Application Priority Data
Dec. 24, 2002 (KR) .................. 10-2002-0083732

(51) Int. Cl.
*H04J 3/06* (2006.01)
(52) U.S. Cl. .................. 370/350; 370/503; 455/502
(58) Field of Classification Search .............. 370/324, 370/350, 335, 503; 455/502, 503; 368/47
See application file for complete search history.

(56) References Cited

U.S. PATENT DOCUMENTS 4,893,318 A * 1/1990 Potash et al. .................. 375/358
6,215,862 B1 4/2001 Lopes
6,768,452 B2 * 7/2004 Gilkes .................. 342/357.15
7,139,346 B2 * 11/2006 Skahan et al. .................. 375/356

FOREIGN PATENT DOCUMENTS

| KR | 1020000011176 | 2/2000 |
| KR | 1020010082067 | 8/2001 |
| KR | 6463463 | 10/2002 |

OTHER PUBLICATIONS

Distribution of time Srevices over Network in Multi-network environment by George a. Shaton, Apr. 2002.*

* cited by examiner

*Primary Examiner*—Ricky Ngo
*Assistant Examiner*—Dady Chery
(74) *Attorney, Agent, or Firm*—Blakely, Sokoloff, Taylor & Zafman LLP

(57) ABSTRACT

The present invention enables the manufacture of an NTP stratum-1 server using IS-95/2000 synchronous mobile terminals as an external reference clock, instead of an expensive atomic clock or a GPS receiver having a difficulty in indoor reception. It is therefore possible to use an NTP server that provides precise time information by a relatively inexpensive method so as to synchronize a subnet or Internet. By using the NTP servers, precise UTC information and a tick rate stable in the system operation can be provided to the nodes of a network.

16 Claims, 4 Drawing Sheets

NETWORK SYNCHRONIZATION SYSTEM AND METHOD USING SYNCHRONOUS MOBILE TERMINAL AS EXTERNAL REFERENCE CLOCK

CROSS REFERENCE TO RELATED APPLICATION

This application is based on Korea Patent Application No. 2002-83732 filed on Dec. 24, 2002 in the Korean Intellectual Property Office, the content of which is incorporated herein by reference.

BACKGROUND OF THE INVENTION (a) Field of the Invention

The present invention relates to a system and method for synchronizing individual units of a wireless network using the time information of synchronous mobile terminals. More specifically, the present invention relates to a system and method for providing NTP (Network Time Protocol) stratum-1 servers through a Bluetooth interface using IS-95/2000 mobile terminals providing a precise and stable time, as a reference clock.

(b) Description of the Related Art

The existing computer clocks have a limitation of accuracy and precision because of their inherent instability, environmental factors, users' random adjustments, or the like. There is thus a great need for a global time standard unique to distributed systems. Namely, network time synchronization is necessary. Network time synchronization for the Internet or the like is provided in various forms according to the adapted algorithm or the characteristic of the synchronization structure concerned, but basically the clients requesting time synchronization read the time of the server that provides time synchronization. An example is the network time protocol (NTP) by Mills that is currently adopted as an Internet standard.

The NTP is a system for time synchronization of computer clocks on the Internet developed in the Delaware University in the U.S.A, and it is used for time synchronization between a distributed time server (DTS) and clients. The NTP-based time synchronization method is an application of the phase-lock method in which the clock is synchronized in a reliable error range by communication of time stamp messages among servers or with a plurality of subnet peers. The NTP version 1 was first described in RFC-958, and it has evolved to the NTP version 2 in RFC-1119. Currently, the RFC-1305 describes the definition for the NTP version 3.

Next, a description will be given as to the schematic configuration of an NTP processor with reference to FIG. 5.

Time synchronization information is transferred from a plurality of peers through a remote processor 800. First, second, and third filters in a peer processor 810 reduce incidental time errors of the delay and clock differences (clock offset) among the systems to be synchronized. A system processor 820 selects one of the time stamps that has the shortest transmission delay, and transfers the offset of the corresponding time stamp to a selection algorithm. A clock control processor 830 selects the most precise and reliable time from the time stamps received from the multiple servers using the clock selection algorithm, and adopts the selected time as a reference.

Next, a description will be given as to the NTP stratum in brief. The NTP has a hierarchical topology that analyzes the time stamping packets received in response to the service request to at least upper layers (upper servers). The uppermost NTP server that is directly synchronized to the atomic clock or international standard time is called an "NTP Stratum-1 server." A server that is synchronized to the time received from the NTP stratum-1 servers and that operates as an NTP server for the lower system is called an "NTP Stratum-2 server." The stratum of the NTP is configured in this manner such that the stratum number is assigned to the NTP according to the sequence number of the stratum.

According to the sensors in 2000, there are at the time of writing about 100 NTP primary servers located in North America, Europe, and the Pacific, almost one third of which are advertised for public access. These public servers are synchronized to national time standards using all known computer-readable time-dissemination services in the world, including the U.S. (WWWVB, WWV, and WWVH), Canada (CHU), the U.K. (MSF), Germany (DCF77), and France (TDF), as well as the GPS, OMEGA, and LORAN navigation systems, and the GOES (Geosynchronous Orbiting Environmental Satellite). In addition, NTP primary servers at the national time standards laboratories of America, Norway, and Australia are directly synchronized to national standard clock ensembles. Some NTP primary servers are located at the Korea Research Institute of Standards and Science.

As described above, NTP servers can be used to synchronize the nodes of a network to one another. Here, the NTP servers must be synchronized to an accurate clock. Conventionally, the NTP servers contain an atomic clock (e.g., cesium or rubidium clock) and are directly synchronized to the GPS.

But atomic clocks are expensive, and the GPS reception is difficult indoors. Most electrical home appliances, for example PCs of a network, contain a local clock with an oscillator comprised of inexpensive quartz. The frequency cycle of these oscillators is readily changed by environmental effects such as electronic noise or heat. This instability increases the error of the individual local clocks with the passage of time. The simplest method of enhancing the stability is to replace the ordinary quartz clock with an expensive atomic clock or a GPS clock, which method is troublesome with a substantial expense.

SUMMARY OF THE INVENTION

It is an advantage of the present invention to provide a precise and stable time for synchronization of the Intranet at home or in offices using a simple structure at a low cost. To achieve the advantage, the present invention provides an NTP stratum-1 server directly synchronized to the time of a plurality of portable CDMA mobile terminals, e.g., IS-95/2000 mobile terminals.

In one aspect of the present invention, there is provided a network synchronization system that includes an NTP (Network Time Protocol) server for providing time synchronization to a plurality of node units in the network. The NTP server provides time synchronization to the node units in the network by using, as a reference clock, a synchronous mobile terminal that is present in the network area and has a wireless interface.

The NTP server includes: an NTP processor for providing time synchronization to the plural node units requesting for the time synchronization; and a virtual clock manager being in communication with the mobile terminal through the wireless interface and managing the mobile terminal as a virtual reference clock.

The virtual clock manager includes: an NTP message processor for analyzing an NTP packet request message received from the NTP processor, reformatting time information acquired from the mobile terminal into an NTP packet format, and sending the NTP packet format as a response message to an NTP packet processor; a clock manager for managing mobile terminals being present in the network area and operated as the reference clock of the NTP server; and an interface including a wireless network protocol, being in charge of communication with the mobile terminal.

Accordingly, the present invention enables the use of the NTP server that provides precise time information by a relatively inexpensive method. By using the NTP server, precise UTC information can be provided to the nodes with a network configuration stable in the system operation.

Prior to the description of the embodiment of the present invention, the terms as used herein including GPS, PTS, UTC, and PPS will be defined in brief.

First, the GPS (Global Positioning System) is a global wireless navigation satellite system established by the U.S. Department of Defense. Each GPS satellite contains an atomic clock. This system has a satellite arrangement such that any point on Earth will be in the visibility of at least four satellites. The user selects four of the satellites to receive time signals and measures the distance from each satellite. From the measurements and the known positions of the four satellites, the receiver can determine the user's three-dimensional position including latitude, longitude, and altitude, and the time deviation of the clock.

The PTS (Precise Time Synchronizer) refers to a high precision time synchronizer. The components of the IS-95 or IS-2000 system must be time-synchronized. The base stations must have their local clock within an error of several scores of nanoseconds and use a reference time received from the PTS and the GPS so as to enhance time precision and accuracy. The mobile terminals are synchronized to the time of the base stations. The signals of the GPS receiver from the satellites contain time information having an error of several scores to hundreds of nanoseconds as well as basic information about the positioning information. The time information acquired by the GPS system is divided into UTC and 1 PPS, which are used by the GPS receiver in acquiring a precise time source and correcting the unstable oscillator of each local clock. The PTS is built in every base station of the synchronous CDMA IS-95/2000 system and it is used to synchronize the individual base stations to one time.

The UTC (Universal Coordinated Time) is the standard mean time currently used worldwide since Jan. 1, 1972. The UTC is under the control of the Bureau International des Poids et Measures (BIPM) and the International Earth Rotation Service (IERS) and is reported as the standard frequency and time signal. The second signal distance of the UTC is based on the international atomic time (TAI), i.e., the data offered by atomic clocks operated in all parts of the world according to the definition for the fundamental unit of time in the International System (SI), the SI second. So, the UTC time flows essentially like the atomic time established by the BIPM.

The PPS (Pulse Per Second) refers to one pulse generated per second. The GPS emits one PPS signal for the time information.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
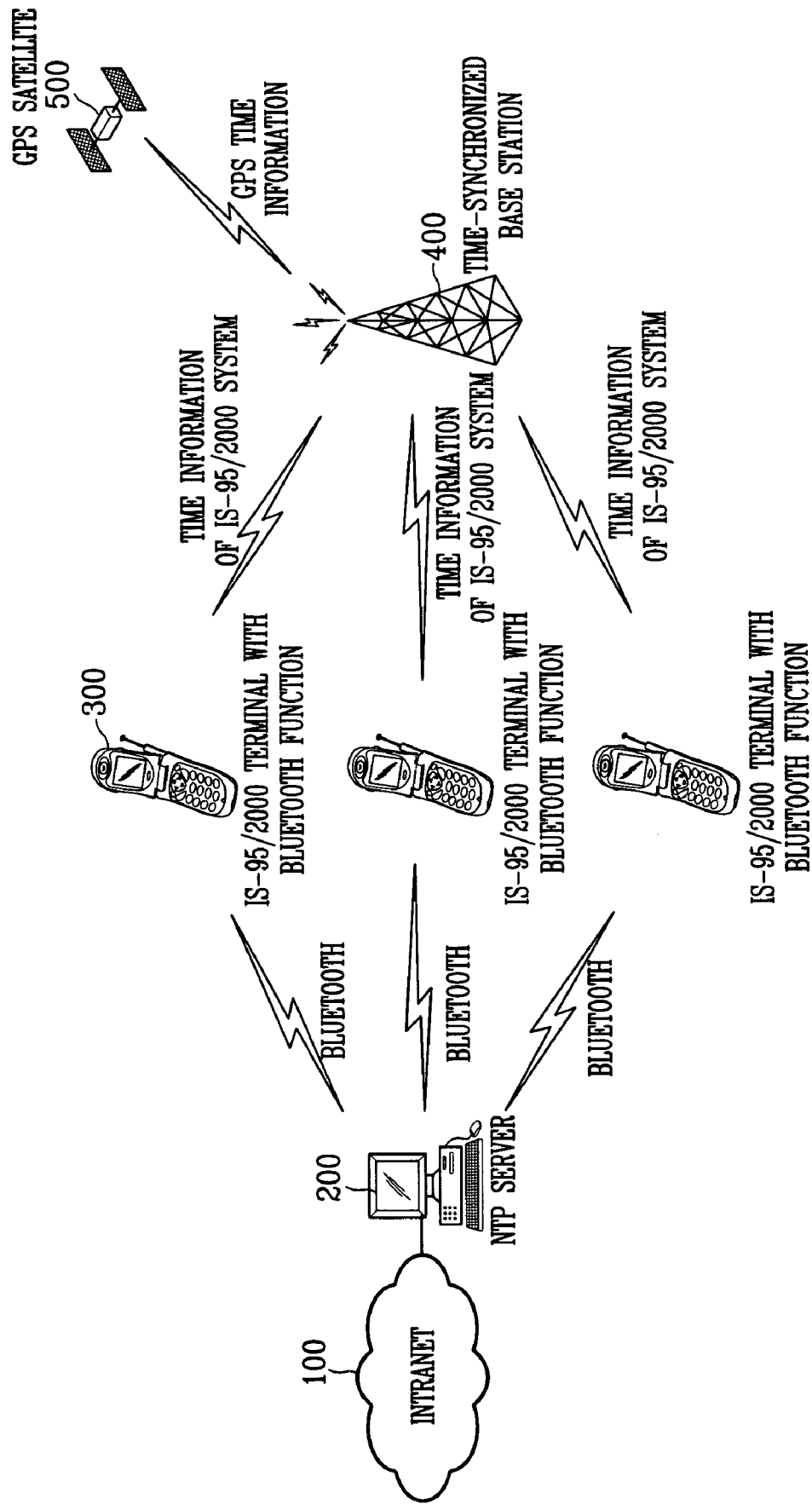
FIG. 1 is a schematic of a network synchronization system according to the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

For an evident description of the present invention, the parts not related to the description are omitted in the illustrations. The same reference numerals are assigned to the same parts all through the specification.

FIG. 1 is a schematic of a network synchronization system according to the present invention.

The network synchronization system according to the present invention comprises an Intranet 100, an NTP server 200, an IS-95/2000 mobile terminal 300 having a Bluetooth function, a base station 400, and a GPS (Global Positioning System) satellite 500.

As illustrated, the time synchronization of the mobile terminal 300, the base station 400, and the GPS satellite 500 is acquired according to a conventional scheme (e.g., IS-95/2000 system). The GPS satellite 500 sends GPS time information to the base station 400, which then sends system time information to the mobile terminal 300 to acquire time synchronization of the mobile terminal, the base station, and the GPS satellite.

After the acquisition of time synchronization, the mobile terminal 300 is directly synchronized to the NTP server 200, more specifically to the NTP stratum-1 server, through a Bluetooth interface in its Bluetooth coverage. In the embodiment of the present invention shown in FIG. 1, the NTP server 200 is used to synchronize the nodes of the Intranet at home or in offices.

The NTP server 200 uses, as a reference clock, the time information of a plurality of motile terminals at a defined position, i.e., in the coverage of the Bluetooth interface (an area that wireless communication is allowed for one Bluetooth master). The NTP server 200 synchronizes its local clock using the reference clock and distributes the synchronized local clock to other nodes in the office as time information.

Figure 2:
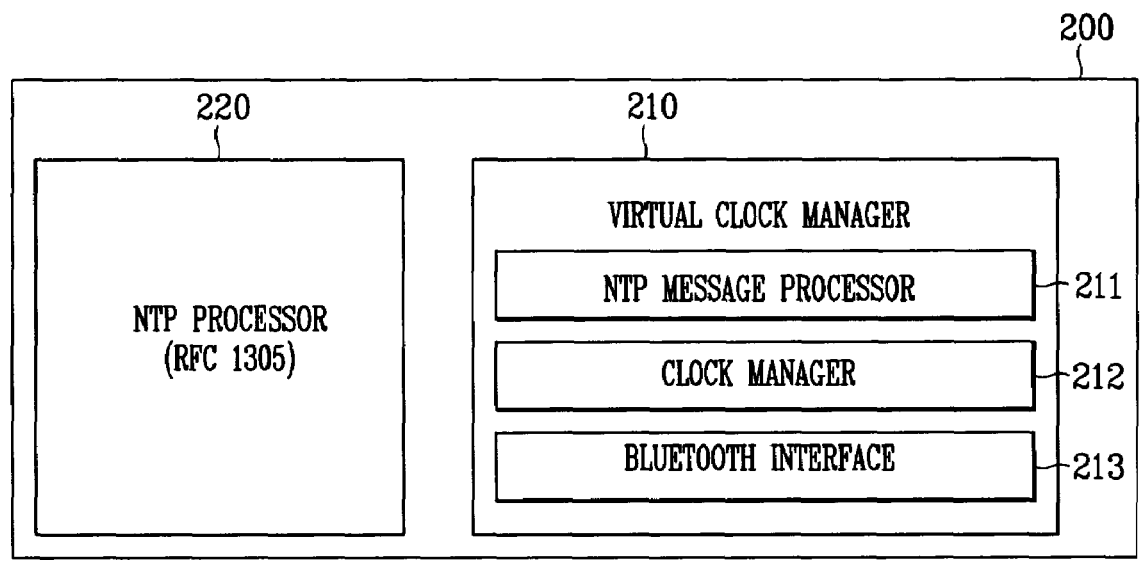
FIG. 2 is a block diagram showing the detailed configuration of an NTP stratum-1 server according to an embodiment of the present invention.

FIG. 2 shows the detailed structure of the NTP stratum-1 server of the NTP server shown in FIG. 1.

The NTP stratum-1 server according to the embodiment of the present invention comprises a virtual clock manager 210, and an NTP processor 220.

Figure 5:
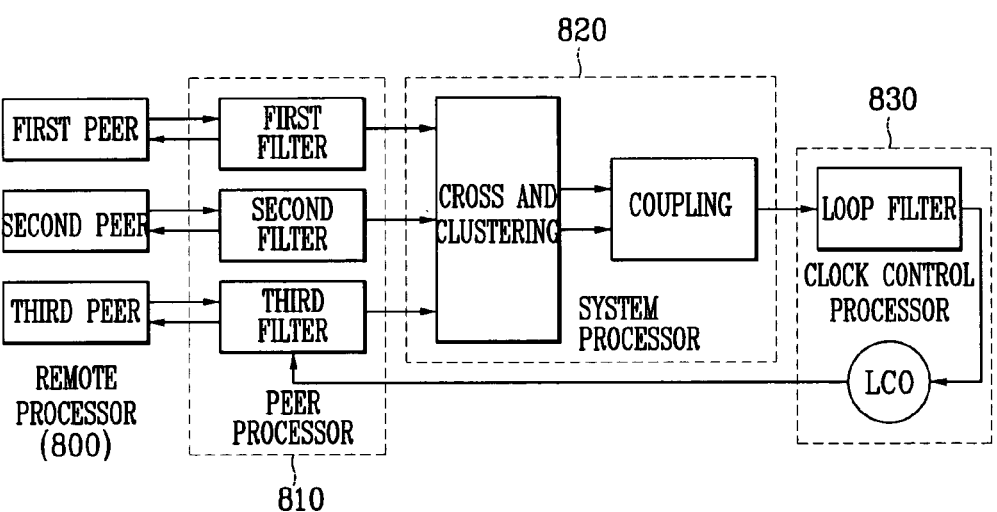
FIG. 5 is a block diagram showing the configuration of an NTP process according to prior art.

The NTP processor 220 selects the most reliable time among the time synchronization information received from multiple peers, as shown in FIG. 5, and uses the selected time as a reference. Accordingly, the NTP processor 220 according to the embodiment of the present invention must be compatible with the existing protocols.

The virtual clock manager 210 includes a Bluetooth interface 213 for communication with units in the Bluetooth coverage, and the Bluetooth interface 213 loads a Bluetooth protocol. The virtual clock manager 210 further includes a clock manager 213 for managing the clock according to the movement and operation of the multiple mobile terminals, and an NTP message processor 211 for processing an NTP protocol message received from the NTP processor 220.

Figure 3:
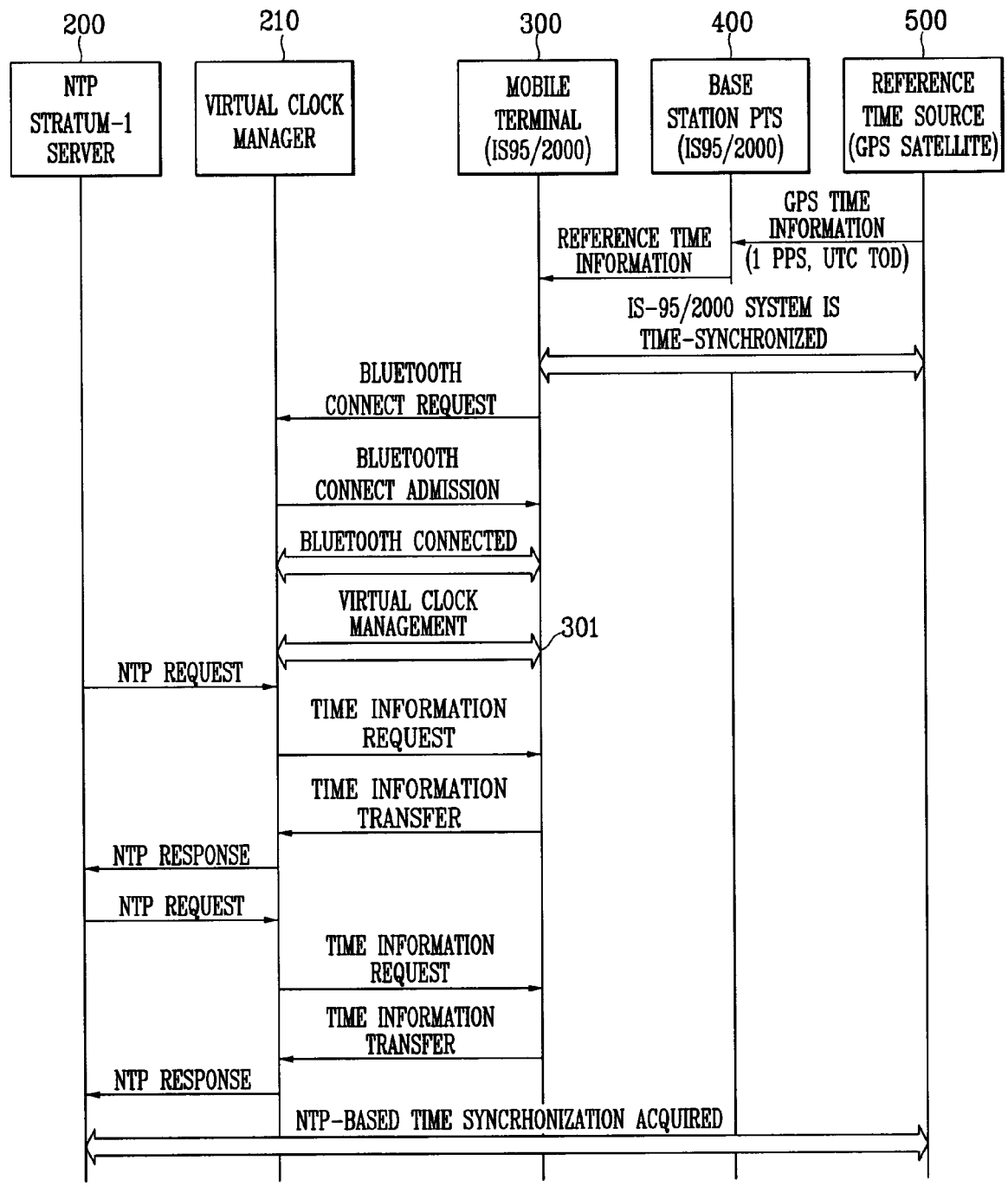
FIG. 3 shows the message flow among the principal components of the system according to an embodiment of the present invention.

FIG. 3 shows the flow of a message among the principal components of the system according to an embodiment of the present invention, in which the line arrow represents a normal message transfer, and the block arrow represents the entrance of the system into a specific state in response to a previous message transfer, rather than the transfer of a specific message.

Next, the message flow of FIG. 3 will be described in regard to the components of FIGS. 1 and 2.

The PTS of the base station 400 receives a reference time source such as UTC and 1 PPS signal from the GPS satellite 500, and the mobile station 300 acquires reference time information. In this manner, the IS-95/2000 CDMA system acquires time synchronization. After acquisition of the precise time, the mobile terminals 300 are Bluetooth-connected to the virtual clock manager 210 of the NTP stratum-1 server in the corresponding area through the Bluetooth interface by a user authentication process. The Bluetooth connection is achieved by the Bluetooth interface 213. In the Bluetooth connection, the mobile terminals registered by the virtual clock manager of the NTP stratum-1 server operate as a reference clock and controls the server.

The virtual clock manager 210 uses the Bluetooth protocol to monitor whether the registered mobile terminals are out of the Bluetooth area or without Bluetooth communication as they are traveling. Also, the virtual clock manager 210 monitors whether a new mobile terminal enters the Bluetooth area, and operates according to the status and event of every virtual reference clock (i.e., the mobile terminal 300). The virtual clock manager 210 manages the mobile terminals in a hierarchical manner using the unit number or authentication information of the Bluetooth unit, or the priority (i.e., the priority as a clock input source) of each mobile terminal, which are previously input.

Upon receiving a time information request message from the NTP server 200, the NTP virtual clock manager 210 receives the time information from the mobile terminal of the uppermost layer. If the mobile terminal of the uppermost layer has a problem and fails to communicate, then the NTP operation is requested to the mobile terminal of the second priority. For this management, the virtual clock manager 210 periodically checks the Bluetooth units, and changes the mobile terminal of the second priority to have the first priority when the mobile terminal of the first priority looses the Bluetooth connection or disappears from the monitored area. The clock manager 212 of FIG. 2 is in charge of the function related to the above-stated virtual clock management.

The NTP processor in the prior art sends an NTP request message to a clock or a server functioning as a clock of the upper layer. Contrarily, the NTP processor 220 of the present invention, which cannot send the NTP request message directly to the mobile terminal, considers the virtual clock manager 210 as a reference clock of the upper layer and sends the NTP request message to the virtual clock manager 210. Upon the NTP message processor 211 of the virtual clock manager 210 receiving the NTP request message, the virtual clock manager 210 commands the clock manager 210 to get the time information of the mobile terminal. The virtual clock manager 210 reads out the current time value from the currently managed mobile terminal of the first priority through the Bluetooth interface. The time parameter thus obtained is reformatted into a packet format requested by the NTP and is sent to the NTP processor 220.

The procedures and the message format used between the NTP processor 220 and the virtual clock manager 210 follow the NTP standard, but those used in the virtual clock manager 210 do not.

The operation of the virtual clock manager 210 of the present invention, which corresponds to virtual clock management 301, will be described in detail with reference to FIG. 4.

Figure 4:
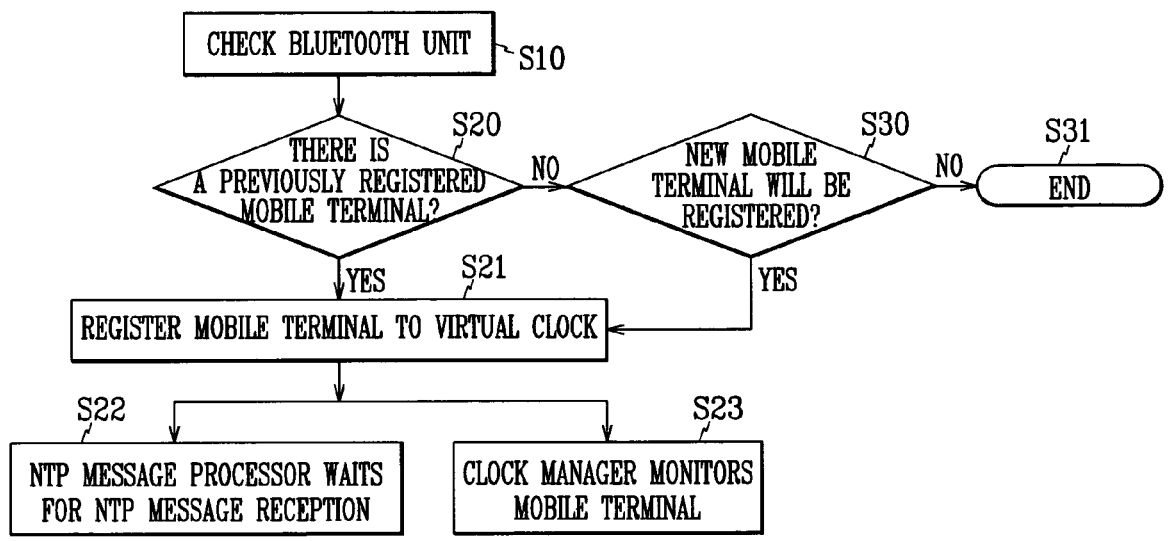
FIG. 4 is a flow chart showing the operation of a virtual clock manager according to an embodiment of the present invention.

Referring to FIG. 4, the virtual clock manager 210 checks the Bluetooth units in the Bluetooth area (in step S10). The virtual clock manager 210 determines whether or not there is a registered mobile terminal among the checked units (in step S20). If there is a registered mobile terminal, then the mobile terminal is registered as a virtual clock; otherwise, if there is no registered mobile terminal, then the virtual clock manager 210 determines whether to register the new mobile terminal among the checked units (in step S30). Without registration, the virtual clock management ends (in step S31). If newly registered, the mobile station is registered as a virtual clock (in step S21). When the virtual clock is registered, the NTP message processor 211 enters an NTP message waiting mode (in step S22), and the clock manager 212 monitors the status of the mobile terminal (in step S23).

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention enables the manufacture of NTP stratum-1 servers with commonly used synchronous CDMA mobile terminals and a Bluetooth interface, without using an expensive atomic clock or a GPS receiver having difficulty with indoor reception. This makes it possible to use NTP servers that provide precise time information by a relatively inexpensive method so as to synchronize a subnet or Internet. By using the NTP servers, precise UTC information and a tick rate that is stable in system operation can be provided to the nodes of a network.

Accordingly, the present invention provides network synchronization that is sensitive to time information to enhance reliability of operation, resulting in the units being able to perform a time-sensitive operation and to set the clock automatically rather than manually when clocks of PCs or electric home appliances gain or lose time.

What is claimed is:

1. A network synchronization system comprising:

an NTP (Network Time Protocol) server for providing time synchronization to a plurality of node units in the network, the NTP server comprising a synchronous mobile terminal as a reference clock to provide time synchronization to the node units in the network, the synchronous mobile terminal being present in the network area and having a wireless interface and a virtual clock manager in communication with the mobile terminal through the wireless interface to manage the mobile terminal as a virtual reference clock, the virtual clock manager comprises a clock manager for managing mobile terminals present in the network area and operated as the reference clock of the NTP server, wherein the clock manager manages the mobile terminals hierarchically using previously input information of each mobile terminal, the information including a unit number, authentication information, or priority as a clock reference source, and upon the NTP server receiving a time information request, the clock manager acquires the time information from an uppermost mobile terminal in response to the request.

2. The network synchronization system as claimed in claim 1, wherein the network includes an Intranet.

3. The network synchronization system as claimed in claim 1, wherein the wireless interface includes a Bluetooth interface.

4. The network synchronization system as claimed in claim 1, wherein the synchronous mobile terminal includes an IS-95/2000 mobile terminal.

5. The network synchronization system as claimed in claim 1, wherein the NTP server includes an NTP stratum-1 server.

6. The network synchronization system as claimed in claim 1, wherein the NTP server comprises:

an NTP processor for providing time synchronization to the plural node units requesting time synchronization.

7. The network synchronization system as claimed in claim 6, wherein the virtual clock manager comprises:

an NTP message processor for analyzing an NTP packet request message received from the NTP processor, reformatting time information acquired from the mobile terminal into an NTP packet format, and sending the NTP packet format as a response message to an NTP packet processor; and an interface including a wireless network protocol, and communicating with the mobile terminal.

8. The network synchronization system as claimed in claim 7, wherein the clock manager monitors whether a mobile terminal previously registered using the wireless network protocol is out of the network area or is unable to communicate, and monitors whether a new mobile terminal enters the network area, wherein when the registered mobile terminal is unable to communicate the clock manager disconnects the mobile terminal, and when a new mobile terminal enters the network area it is registered by the clock manager, and wherein the clock manager periodically checks the node units in the network, and if a registered mobile terminal of a first priority is unable to communicate, the priority of the mobile terminal is changed to a lowest priority and a mobile station of a second priority is made to have the first priority.

9. A network synchronization method, which is for synchronizing a network that includes an NTP server using a synchronous mobile terminal as an external reference clock, the network synchronization method comprising:

(a) the synchronous mobile terminal with a wireless interface getting a connection to the network;

(b) the NTP server registering the network-connected synchronous mobile terminal as a virtual reference clock wherein registering comprises registering the mobile terminal hierarchically using previously input information of each mobile terminal, the information including a unit number, authentication information or priority as a clock reference source;

(c) the NTP server receiving a time synchronization request message from a plurality of node units in the network; and (d) the NTP server setting the registered mobile terminal as the virtual reference clock and acquiring time synchronization of the node units requesting time synchronization and acquiring time information from an uppermost mobile terminal and responding to it, upon the NTP server receiving a time information request.

10. The network synchronization method as claimed in claim 9, wherein (b) further comprises:

monitoring whether a mobile terminal previously registered using a protocol of the wireless network is out of the network area or is unable to communicate;

monitoring whether a new mobile terminal enters the network area;

disconnecting the mobile terminal when the registered mobile terminal is unable to communicate, and registering the newly-entered mobile terminal to a reference clock layer, after the monitoring; and periodically checking the units in the network, and if a registered mobile terminal of a first priority is unable to communicate, changing the priority of the mobile terminal to a lowest priority and making a mobile station of a second priority have the first priority.

11. The network synchronization method as claimed in claim 9, wherein (d) further comprises:

the virtual clock manager analyzing an NTP packet request message received from the NTP processor; and reformatting the time information acquired from the mobile terminal into an NTP packet format, and sending the NTP packet format as a response message to an NTP packet processor.

12. An NTP server, which synchronizes a plurality of node units in a network using a synchronous mobile terminal with a wireless interface as a reference clock, the NTP server comprising:

an NTP processor for providing time synchronization to the plural node units requesting time synchronization; and a virtual clock manager being in communication with the mobile terminal through the wireless interface and managing the mobile terminal as a virtual reference clock, the virtual clock manager comprises a clock manager for managing mobile terminals being present in the network area and operated as the reference clock of the NTP server wherein the clock manager manages the mobile terminals hierarchically using previously input information of each mobile terminal, the information including a unit number, authentication information, or priority as a clock reference source, and upon the NTP server receiving a time information request, the clock manager acquiring the time information from an uppermost mobile terminal in response to the request.

13. The NTP server as claimed in claim 12, wherein the wireless interface includes a Bluetooth interface.

14. The NTP server as claimed in claim 12, wherein the NTP server includes an NTP stratum-1 server.

15. The NIP server as claimed in claim 12, wherein the virtual clock manager comprises:

an NTP message processor for analyzing an NTP packet request message received from the NTP processor, reformatting time information acquired from the mobile terminal into an NTP packet format, and sending the NTP packet format as a response message to an NTP packet processor; and an interface including a wireless network protocol and being in charge of communication with the mobile terminal.

16. The NTP server as claimed in claim 15, wherein the clock manager monitors whether a mobile terminal previously registered using the wireless network protocol is out of the network area or unable to communicate, and monitors whether a new mobile terminal enters the network area,
wherein when the registered mobile terminal is unable to communicate the clock manager disconnects the mobile terminal, and when a new mobile terminal enters the network area it is registered by the clock manager, and wherein the clock manager periodically checks the node units in the network, and if a registered mobile terminal of a first priority is unable to communicate it changes the priority of the mobile terminal to a lowest priority and makes a mobile station of a second priority have the first priority.

* * * * *